United States Patent
Guo et al.

(10) Patent No.: US 9,147,223 B2
(45) Date of Patent: Sep. 29, 2015

(54) METHOD AND DEVICE FOR LOCALIZED BLIND WATERMARK GENERATION AND DETECTION

(71) Applicant: TENCENT TECHNOLOGY (SHENZHEN) COMPANY LIMITED, Shenzhen, Guangdong (CN)

(72) Inventors: Xiaowei Guo, Shenzhen (CN); Kai Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/356,243

(22) PCT Filed: Dec. 18, 2012

(86) PCT No.: PCT/CN2012/086832
§ 371 (c)(1),
(2) Date: May 5, 2014

(87) PCT Pub. No.: WO2013/091525
PCT Pub. Date: Jun. 27, 2013

(65) Prior Publication Data
US 2014/0307916 A1 Oct. 16, 2014

(30) Foreign Application Priority Data
Dec. 20, 2011 (CN) .......................... 2011 1 0430387

(51) Int. Cl.
*G06K 9/00* (2006.01)
*G06T 1/00* (2006.01)
(52) U.S. Cl.
CPC ............... *G06T 1/0078* (2013.01); *G06T 1/005* (2013.01); *G06T 1/0028* (2013.01); *G06T 2201/0052* (2013.01); *G06T 2201/0065* (2013.01); *G06T 2201/0083* (2013.01)
(58) Field of Classification Search
None
See application file for complete search history.

(56) References Cited

U.S. PATENT DOCUMENTS 5,825,892 A * 10/1998 Braudaway et al. ............ 380/51
6,563,935 B1 * 5/2003 Echizen et al. ............... 382/100
(Continued)

FOREIGN PATENT DOCUMENTS

| CN | 1414778 A | 4/2003 |
|---|---|---|
| CN | 1758282 A | 4/2006 |

(Continued)

OTHER PUBLICATIONS

Ge, Qing-Ming, Zhe-Ming Lu, and Xu-mu Niu. "Oblivious video watermarking scheme with adaptive embedding mechanism." in Machine Learning and Cybernetics, 2003 International Conference on, vol. 5, pp. 2876-2881. IEEE, 2003.*

(Continued)

*Primary Examiner* — Sumati Lefkowitz
*Assistant Examiner* — Carol Wang
(74) *Attorney, Agent, or Firm* — Oppedahl Patent Law Firm LLC (57) ABSTRACT

The present disclosure discloses a method and device for localized blind watermark generation and detection. The method for localized blind watermark generation may include: generating an N-dimensional pseudorandom initial sequence according to a preset key, and generating a 2N-dimensional sequence by inverting the initial sequence bit by bit and appending the inverted sequence to the initial sequence; and extracting the first 2N coefficients of a feature point of an image to form a coefficient sequence, and acquiring a parity of a bit of the coefficient sequence according to a parity of a corresponding bit of the 2N-dimensional sequence. With the present disclosure, redundant expansion may be performed on watermark data to increase the scale of test data with respect to the original bit data before embedding the test data into a transformation domain of the vicinity of a feature point of an image; during detection, a sequence extracted from the transformation domain of the vicinity of a certain feature point is checked bit by bit, and it is determined whether a watermark is embedded in the vicinity of the point base on the result of the examination, thereby enhancing a watermark detecting efficiency.

13 Claims, 6 Drawing Sheets

(56) References Cited

U.S. PATENT DOCUMENTS

| | | | |
|---|---|---|---|
| 6,704,431 B1* | 3/2004 | Ogawa et al. | 382/100 |
| 2002/0154778 A1* | 10/2002 | Mihcak et al. | 380/262 |
| 2003/0108219 A1* | 6/2003 | Muratani et al. | 382/100 |
| 2003/0128863 A1 | 7/2003 | Hayashi | |
| 2003/0172275 A1* | 9/2003 | Lee et al. | 713/176 |
| 2008/0052516 A1* | 2/2008 | Tachibana et al. | 713/176 |
| 2010/0034513 A1* | 2/2010 | Nakano et al. | 386/94 |

FOREIGN PATENT DOCUMENTS

| | | |
|---|---|---|
| CN | 101030293 A | 9/2007 |
| CN | 101930587 A | 12/2010 |

OTHER PUBLICATIONS

Potdar, Vidyasagar M., Song Han, and Elizabeth Chang. "A survey of digital image watermarking techniques." In Industrial Informatics, 2005. INDIN'05. 2005 3rd IEEE International Conference on, pp. 709-716. IEEE, 2005.*

Lin Jianzeng, DCT-domain Blind Watermarking Alogrithm Based on Quantization of parity, Journal of Panzhihua University, Dec. 2009, vol. 26, No. 6, pp. 28-30, See International Search Report.

Zhao, Xuezhang et al., Blind Watermarking Algorithm Based on Multi-wavelet Domain and DCT, Computer Simulation, Mar. 2011, vol. 28, No. 3, pp. 126-129, See International Search Report.

International Search Report in international application No. PCT/CN2012/086832, mailed on Mar. 28, 2013.

English Translation of the Written Opinion of the International Search Authority in international application No. PCT/CN2012/086832, mailed on Mar. 28, 2013.

Notification of the First Office Action of Chinese application No. 201110430387.0, issued on Aug. 14, 2015.

* cited by examiner

METHOD AND DEVICE FOR LOCALIZED BLIND WATERMARK GENERATION AND DETECTION

The present application claims benefit of priority of Chinese patent application No. 201110430387.0 filed on Dec. 20, 2011, under the applicant Tencent Technology (Shenzhen) Co., Ltd. and the title "method and device for localized blind watermark generation and detection", the full text of which is incorporated herein by reference.

TECHNICAL FIELD

The present disclosure relates to the technology of watermark detection, and in particular to method and device for localized blind watermark generation and detection.

BACKGROUND

A digital watermark is an invisible identifier embedded into image data, video data, or audio data, and can be used for copyright protection, authentication, and tracking of multimedia data, and the like.

Digital watermarking technologies may be divided into express watermarking and blind watermarking according to watermark extraction. Extraction of an express watermark requires original data in which the watermark is embedded, while a blind watermark only requires a key. Generally speaking, the express watermark is robust, but cost a lot in storage, and does not meet a practical requirement very well. Therefore, the blind watermark is a trend in watermarking algorithm research.

Image watermarking technologies may be divided into a globally embedded watermarking and a locally embedded watermarking according to the way in which a watermark is embedded. The watermark information in the globally embedded watermarking is embedded into a transformation domain of the whole image, such as a space domain, a frequency domain, a wavelet domain, or the like. Experiments show that such a method has a relatively robust resistance against an interference such as JPEG compression, interference by noise, filtering, or the like. However, as the information is embedded in the whole image, when the image is tailored, the size of the original image and the position of the tailored image in the original image are unavailable, it will be difficult to determine the position where the watermark is embedded, and therefore a globally embedded watermark is susceptible to an attack by tailoring; a locally embedded watermark is embedded based on content of the image, and the watermark information is repeatedly embedded onto a transformation domain of the vicinity of a relatively stable and prominent feature point in the image. Thus, even if image goes through a large-scale tailoring or modification, the position of the watermark can still be determined through the feature point, thereby recovering the watermark information. As in theory, the localized watermark has a good robustness against various attacks, and the localized watermark has become a hot spot of research in recent years.

Localized blind watermarking is a combination of both the blind watermarking and the localized watermarking. Localized blind watermarking in relevant art mainly relates to techniques such as watermark embedding, watermark detecting and extracting, and the like. A flow of embedding a localized blind watermark is as follows: first, a number of feature points in the original image is extracted, and local DCT (Discrete Cosine Transform) or Wavelet transformation is performed on the vicinity of the feature points; then, a pseudorandom bit sequence generated by a specific key (namely, the watermark information) is embedded into the transformation domain according to a preset embedding rule; finally, a local inverse transformation is performed to obtain a watermarked image. A flow of detecting and extracting a localized blind watermark is as follows: a feature point of an image is extracted, and local DCT or Wavelet transformation is performed on the vicinity of the feature point; then, a bit sequence with the same dimension as the watermark information is extracted based on a preset extracting rule, and a match is performed to obtain a degree of similarity of the bit sequence with a pre-embedded watermark information (available from the key); and a watermark is deemed to exist if the degree of similarity is greater than a certain threshold T, otherwise no watermark is deemed to exist.

There are some disadvantages associated with the aforementioned localized blind watermarking, namely:

1) Watermark detection is still key-dependent, and during the detection, different keys are required for the match in order to complete the detection, thus leading to a low detecting efficiency;

2) when performing the match to obtain a degree of similarity with the watermark information, each bit in a watermark information space has, by default, the same credibility in the match, leading to no accurate match in some cases, for example: assume an unknown sequence of 11111, watermark A of 11110, watermark B of 01111, in which case it is impossible to determine which one of watermarks A and B is more credible when the same extracted sequence has the same degree of similarity with the two different watermarks A and B; according to a match based on the difference, there is only one bit in both watermarks A and B that is different from that in the unknown sequence, and it is impossible to determine whether the unknown sequence is watermark A or watermark B, thus leading to a low detecting accuracy.

SUMMARY

According to various embodiments, the present disclosure provides a method and device for localized blind watermark generation and detection capable of enhancing the efficiency and accuracy of watermark detecting.

An embodiment of the present disclosure proposes a method for localized blind watermark generation, including:

generating an N-dimensional pseudorandom initial sequence according to a preset key, and generating a 2N-dimensional sequence by inverting the initial sequence bit by bit and appending the inverted sequence to the initial sequence; and extracting the first 2N coefficients of a feature point of an image to form a coefficient sequence, and acquiring a parity of the coefficient sequence according to the parity of a corresponding bit of the 2N-dimensional sequence.

An embodiment of the present disclosure further proposes a device for localized blind watermark generation, including:

a sequence generating unit configured to generate an N-dimensional pseudorandom initial sequence according to a preset key, and generate a 2N-dimensional sequence by inverting the initial sequence bit by bit and appending the inverted sequence to the initial sequence; and a watermark imbedding unit configured to extract the first 2N coefficients of a feature point of an image to form a coefficient sequence, and acquire a parity of the coefficient sequence according to the parity of a corresponding bit of the 2N-dimensional sequence.

An embodiment of the present disclosure further proposes a method for localized blind watermark detection, including:

extracting a feature point of an image, and performing domain transformation; and extracting a sequence of a transformation domain of the vicinity of the feature point of the image, checking the sequence bit by bit, and determining that a watermark is imbedded in the vicinity of the feature point of the image when a number of bits with equal values in the first N coefficients and in the last N coefficients in the sequence is within a preset range.

An embodiment of the present disclosure further proposes a device for localized blind watermark detection, including:

an extracting and transforming unit configured to extract a feature point of an image, and perform domain transformation; and a watermark checking unit configured to extract a sequence of a transformation domain of the vicinity of the feature point of the image, check the sequence bit by bit, and determine that a watermark is imbedded in the vicinity of the feature point of the image when a number of bits with equal values in the first N coefficients and in the last N coefficients in the sequence is within a preset range.

An embodiment of the present disclosure further proposes a method for localized blind watermark matching, including:

when a watermark is imbedded, calculating a possibility of a bit being odd or even, and calculating a bit credibility; and performing a watermark matching according to the bit credibility.

An embodiment of the present disclosure further proposes a device for localized blind watermark matching, including:

a credibility calculating unit configured to calculate a possibility of a bit being odd or even, and calculate a bit credibility when a watermark is imbedded; and a watermark matching unit configured to perform a watermark matching according to the bit credibility.

With the method and device for localized blind watermark generation and detection according to embodiments of the present disclosure, redundant expansion may be performed on watermark data to increase the scale of test data with respect to the original bit data (by at least a factor of 2, for example) before embedding the test data into a transformation domain of the vicinity of a feature point of an image; during detection, a sequence extracted from the transformation domain of the vicinity of a certain feature point is checked bit by bit, and it is determined whether a watermark is embedded in the vicinity of the point base on the result of the check; as the technical solution of an embodiment of the present disclosure the is key-independent, the existence of a watermark is determined directly from a feature of an image per se, thereby enhancing a watermark detecting efficiency; meanwhile, during watermark matching, watermark matching may be performed according to the bit credibility; by observing the distribution of each bit in sequences extracted at different valid points, the credibility of each bit is given based on posteriori estimation, and watermark matching is performed according to the credibility, thereby enabling enhanced accuracy in watermark identification. As a watermark is embedded by way of localized embedding, the watermark has excellent robustness against attacks such as image cropping, partial PS (Photoshop) processing or modification of content of the image, or the like, thus meeting a practical requirement better.

DETAILED DESCRIPTION

It should be noted that specific embodiments described here is merely intended to explain the present disclosure, and is not intended to limit the present disclosure.

Figure 1:
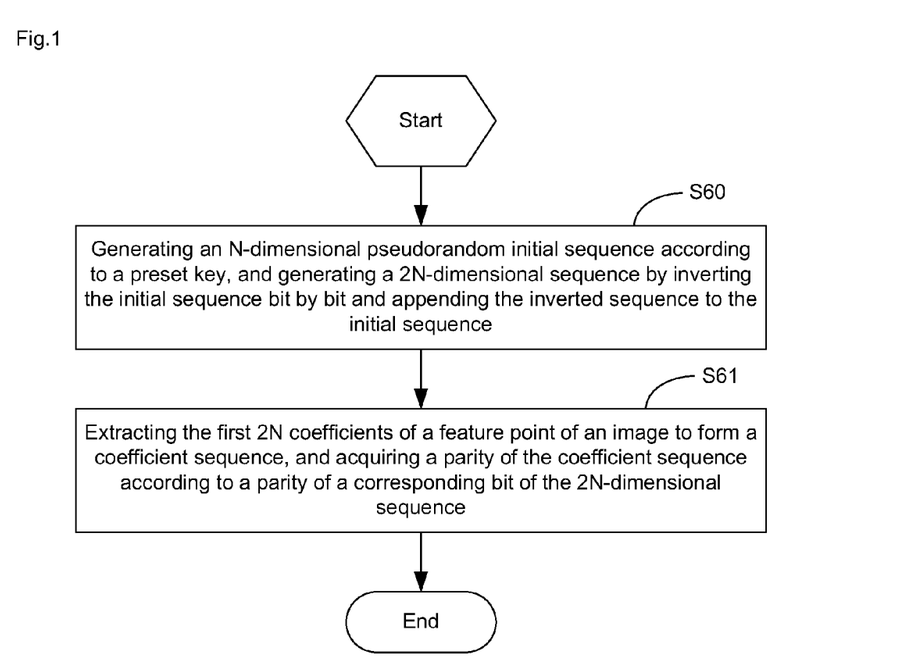
FIG. 1 is a flowchart of steps in an embodiment of a method for localized blind watermark generation according to the present disclosure.

FIG. 1 illustrates an embodiment of a method for generating a localized blind watermark according to the present disclosure. The method may include:

Step S60, generating an N-dimensional pseudorandom initial sequence according to a preset key, and generating a 2N-dimensional sequence by inverting the initial sequence bit by bit and appending the inverted sequence to the initial sequence; and Step S61, extracting the first 2N coefficients of a feature point of an image to form a coefficient sequence, and acquiring a parity of the coefficient sequence according to the parity of a corresponding bit of the 2N-dimensional sequence.

Step S61 may specifically include: extracting the first 2N coefficients of a DCT block in the feature point of the image, obtaining the coefficient sequence by arranging the extracted coefficients in one dimension, quantizing the coefficient sequence, acquiring the parity of each quantized bit of coefficient of the coefficient sequence according to the parity of a bit of the 2N-dimensional sequence corresponding to the quantized bit of coefficient of the 2N coefficient sequence. The preset key may be an original image file (data), the initial sequence is a sequence generated by performing an MD5 algorithm on the original image file.

The flow of embedding a watermark in an image may include: generating watermark information, extracting a feature point of an image, performing DCT transformation, and performing watermark embedding.

The procedure for generating watermark information may be: generating an N-dimensional pseudorandom initial sequence S according to a specific key K, and generating a 2N-dimensional sequence SS by inverting the initial sequence S bit by bit and appending the inverted sequence to the initial sequence S. In this embodiment, the key K may be the original image file, sequence S may be a 128-dimensional sequence generated by performing an MD5 algorithm on the original image file.

The procedure for extracting a feature point of an image may be: an RGB→YCrCb color domain transformation is performed on the original image, an illumination component Y in YCrCb is extracted. A Harris angular point is extracted on a Y diagram; and to avoid interference among pieces of embedded watermark information, it is required that there is at least a certain distance D between spatial positions of extracted angular points. In the embodiment, D may take a value of 48 pixels, a Harris window may have a size of 5×5 pixels.

The DCT transformation may be: performing a sub-block DCT transformation in an R×R-pixel window of the vicinity of each extracted feature point, with a block size of 8×8. In this embodiment, R may take a value of 32.

The performing watermark embedding may be that: for each DCT-transformed feature point, the first M coefficients of all DCT blocks are extracted in a zig-zag way, and a coefficient sequence W is obtained by arranging the extracted coefficients in one dimension, wherein the dimension of W is to be kept equal to that of the watermark sequence SS. Then quantization is performed with a quantizing factor of F, and the parity of each quantized coefficient of the coefficient sequence W is determined depending on whether a bit in the sequence SS has a value of 0 or 1. In the embodiment, M may take a value of 16, and when SS[i] is 0, W[i] takes an even number closest to W[i] after the quantization, otherwise W[i] takes an odd number.

With the method for localized blind watermark generation, during watermark detection, a sequence extracted from a transformation domain of the vicinity of a certain feature point under detection may be checked bit by bit, and it is determined whether a watermark is embedded in the vicinity of the point base on the result of the check. Thus, watermark detection is no longer key-dependent, which enables a faster and easier watermark detection with a better detection efficiency.

Figure 2:
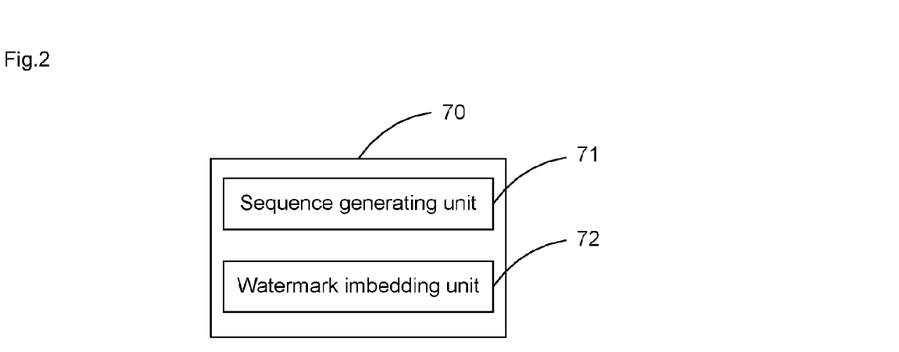
FIG. 2 is a flowchart of steps in an embodiment of a device for localized blind watermark generation according to the present disclosure.

Referring to FIG. 2, the present disclosure introduces an embodiment of a device for localized blind watermark generation. The device may include a sequence generating unit 71 and a watermark imbedding unit 72. The sequence generating unit 71 is configured to generate an N-dimensional pseudorandom initial sequence according to a preset key, and generate a 2N-dimensional sequence by inverting the initial sequence bit by bit and appending the inverted sequence to the initial sequence; the watermark imbedding unit 72 is configured to extract the first 2N coefficients of a feature point of an image to form a coefficient sequence, and acquire a parity of the coefficient sequence according to the parity of a corresponding bit of the 2N-dimensional sequence.

The watermark imbedding unit 72 is specifically configured to: extract the first 2N coefficients of a DCT block in the feature point of the image, obtain the coefficient sequence by arranging the extracted coefficients in one dimension, quantize the coefficient sequence, acquire the parity of each quantized coefficient of the coefficient sequence according to the parity of a bit of the 2N-dimensional sequence corresponding to the 2N coefficient sequence. The preset key may be an original image file (data), the initial sequence is a sequence generated by performing an MD5 algorithm on the original image file.

The flow of embedding a watermark in an image may include: generating watermark information, extracting a feature point of an image, performing DCT transformation, and performing watermark embedding, wherein the generating watermark information is executed by the sequence generating unit 71, and the rest of the flow of embedding a watermark in an image is executed by the watermark imbedding unit 72.

The generating watermark information may be: generating an N-dimensional pseudorandom initial sequence according to a specific key K, and generating a 2N-dimensional sequence SS by inverting the initial sequence S bit by bit and appending the inverted sequence to the initial sequence S. In the embodiment, key K may be the original image file, sequence S may be a 128-dimensional sequence generated by performing an MD5 algorithm on the original image file.

The extracting a feature point of an image may be that: an RGB→YCrCb color domain transformation is performed on the original image, an illumination component Y in YCrCb is extracted. a Harris angular point is extracted on a Y diagram, to avoid interference among pieces of embedded watermark information, it is required that there is at least a certain distance D between spatial positions of extracted angular points. In the embodiment, D may take a value of 48 pixels, a Harris window may have a size of 5×5 pixels.

The DCT transformation may be: performing a sub-block DCT transformation in an R×R-pixel window of the vicinity of each extracted feature point, with a block size of 8×8. In the embodiment, R may take a value of 32.

The performing watermark embedding may be that: for each DCT-transformed feature point, the first M coefficients of all DCT blocks are extracted in a zig-zag way, and a coefficient sequence W is obtained by arranging the extracted coefficients in one dimension, wherein the dimension of W is to be kept equal to that of the watermark sequence SS. Then quantization is performed with a quantizing factor of F, and the parity of each quantized coefficient of the coefficient sequence W is determined depending on whether a bit in the sequence SS has a value of 0 or 1. In the embodiment, M may take a value of 16, and when SS[i] is 0, W[i] takes an even number closest to W[i] after the quantization, otherwise W[i] takes an odd number.

With the aforementioned device for localized blind watermark generation, during watermark detection, a sequence extracted from a transformation domain of the vicinity of a certain feature point under detection may be checked bit by bit, and it is determined whether a watermark is embedded in the vicinity of the point based on the result of the check. Thus, watermark detection is no longer key-dependent, which enables a faster and easier watermark detection with a better detection efficiency.

Figure 3:
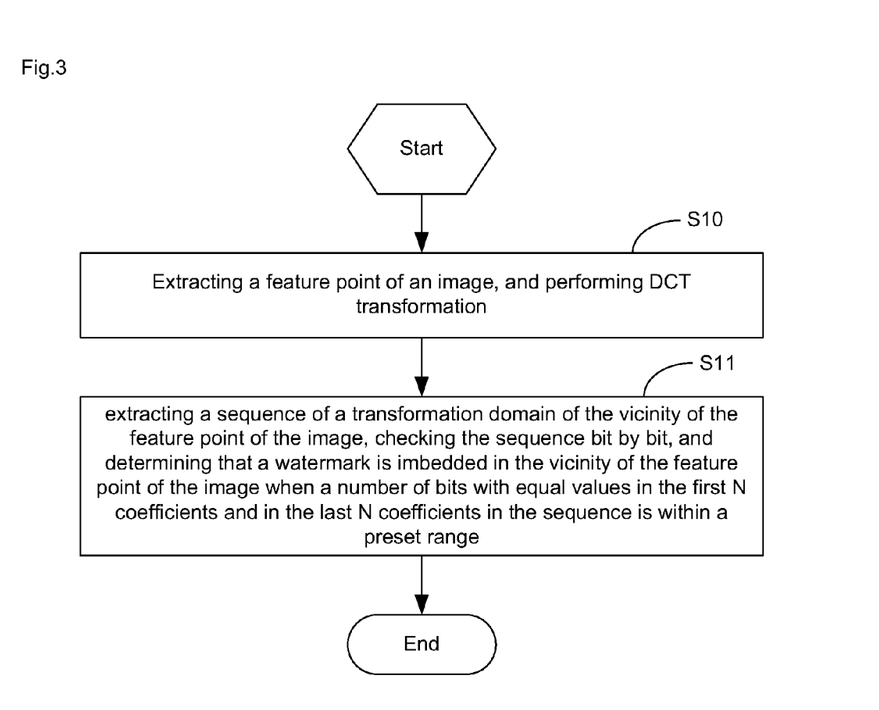
FIG. 3 is a flowchart of steps in an embodiment of a method for localized blind watermark detection according to the present disclosure.

Referring to FIG. 3, an embodiment of a method for localized blind watermark detection according to the present disclosure is introduced. The method may include:

step S10, extracting a feature point of an image, and performing domain transformation; and step S11, extracting a sequence of a transformation domain of the vicinity of the feature point of the image, checking the sequence bit by bit, and determining that a watermark is imbedded in the vicinity of the feature point of the image when a number of bits with equal values in the first N coefficients and in the last N coefficients in the sequence is within a preset range.

With the method for localized blind watermark detection, during watermark detection, a sequence extracted from a transformation domain of the vicinity of a certain feature point under detection may be checked bit by bit, and it is determined whether a watermark is embedded in the vicinity of the point base on the result of the check. Thus, watermark detection is no longer key-dependent, which enables a faster and easier watermark detection with a better detection efficiency.

The flow of embedding a watermark in an image may include: generating watermark information, extracting a feature point of an image, performing DCT transformation, performing watermark embedding, and acquiring a watermarked image.

The generating watermark information may be: generating an N-dimensional pseudorandom initial sequence S according to a specific key K, and generating a 2N-dimensional sequence SS by inverting the initial sequence S bit by bit and appending the inverted sequence to the initial sequence S. In the embodiment, the key K may be the original image file, and the sequence S may be a 128-dimensional sequence generated by performing an MD5 algorithm on the original image file.

The extracting a feature point of an image may be that: an RGB→YCrCb color domain transformation is performed on the original image, an illumination component Y in YCrCb is extracted. A Harris angular point is extracted on a Y diagram; and to avoid interference among pieces of embedded watermark information, it is required that there is at least a certain distance D between spatial positions of extracted angular points. In the embodiment, D may take a value of 48 pixels, and a Harris window may have a size of 5×5 pixels.

The DCT transformation may be: performing a sub-block DCT transformation in an R×R-pixel window of the vicinity of each extracted feature point, with a block size of 8×8. In the embodiment, R may take a value of 32.

The performing watermark embedding may be that: for each DCT-transformed feature point, the first M coefficients of all DCT blocks are extracted in a zig-zag way, and a coefficient sequence W is obtained by arranging the extracted coefficients in one dimension, wherein the dimension of W is to be kept equal to that of the watermark sequence SS. Then quantization is performed with a quantizing factor of F, and the parity of each quantized coefficient of the coefficient sequence W is determined depending on whether a bit in the sequence SS has a value of 0 or 1. In the embodiment, M may take a value of 16, and when SS[i] is 0, W[i] takes an even number closest to W[i] after the quantization, otherwise W[i] takes an odd number.

The flow of acquiring a watermarked image may be: performing inverse transformation on all DCT blocks and obtaining a new Y1 component, then performing the YCrCb→RGB transformation and obtaining the watermarked RGB image.

In image watermark detection, the method may include: extracting a feature point of an image, performing DCT transformation, detecting whether there is any watermark, calculating a watermark credibility, watermark identifying and matching, and the like.

The processing flow in the extracting a feature point of an image and the performing DCT transformation in the step S10 may be the same as the processing flow in the extracting a feature point of an image and the performing DCT transformation during the watermark embedding.

The step S11 is the processing flow of the detecting whether there is any watermark, which may specifically include: extracting a coefficient sequence made up of multiple coefficients of a sub-block DCT of the vicinity of the feature point of the image, counting the number of bits with equal values in the first N coefficients and in the last N coefficients in the coefficient sequence, and determining that a watermark is imbedded in the vicinity of the feature point of the image when the number is less than a preset threshold (or greater than a preset threshold), wherein the value of a bit is calculated according to the parity of the bit, and the N is a positive integer.

During detection, for each feature point P of the image, a coefficient sequence W made up of the first M coefficients of the sub-block DCT of the vicinity of the feature point is extracted, and the parity of each coefficient W[i] is tested, wherein i is a natural number. In the embodiment, if W[i] is odd, then the detected sequence UnKnowSS[i] takes a bit value of 1, otherwise UnKnowSS[i] takes a bit value of 0. A number Q of bits with equal values in the first N coefficients (i.e. from UnKnowSS[0] to UnKnowSS[i]) and in the last N coefficients (i.e. from UnKnowSS[i+1] to UnKnowSS[i+N]) in the UnKnowSS is counted; and if Q is less than a preset threshold T, then the feature point is deemed to be a valid point, in which case the sequence UnknownSS is a valid sequence ValidSS, namely, includes valid watermark information. In the embodiment, the T may take a value of 12.

Figure 4:
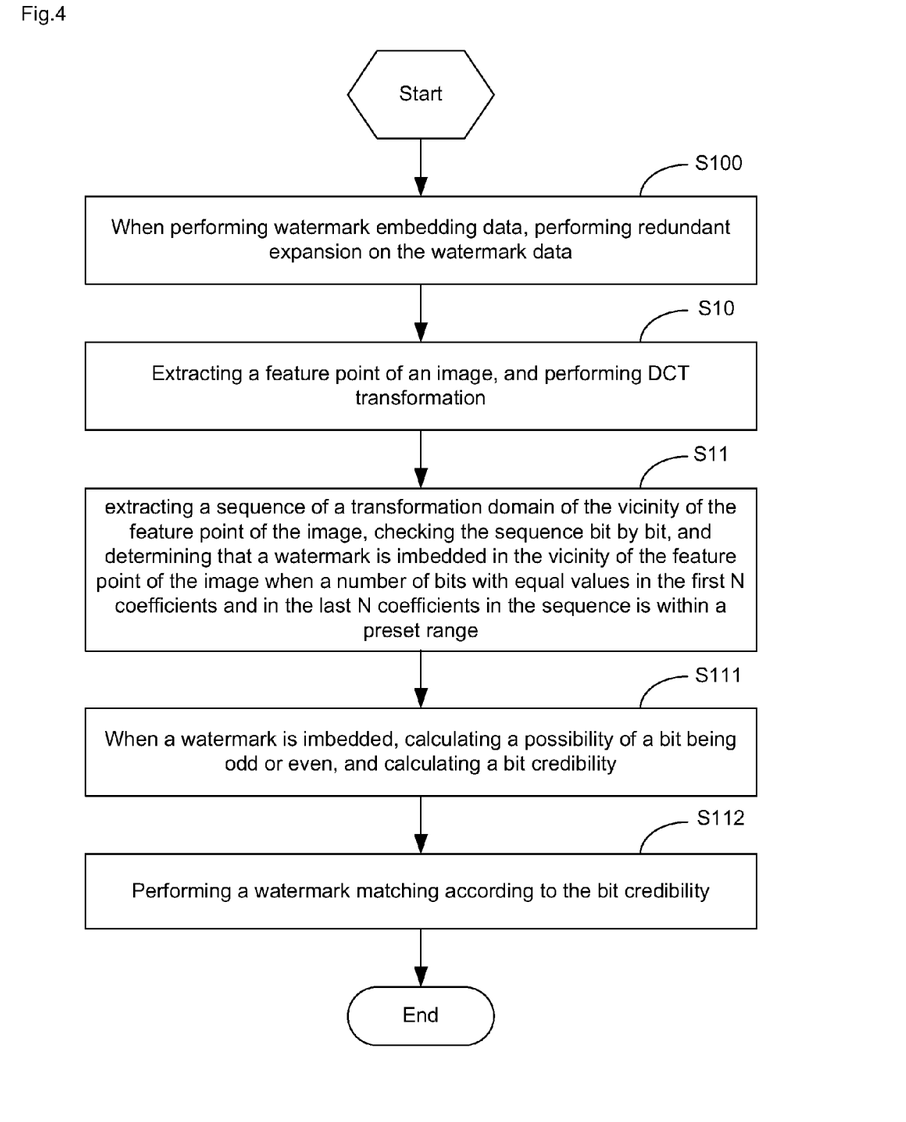
FIG. 4 is a flowchart of steps in another embodiment of a method for localized blind watermark detection according to the present disclosure.

Referring to FIG. 4, after step S11, the method in another embodiment of the present disclosure may include:

step S111, calculating a possibility of a bit being odd or even, and calculating a bit credibility when a watermark is imbedded; and step S112, performing a watermark matching according to the bit credibility.

Figure 5:
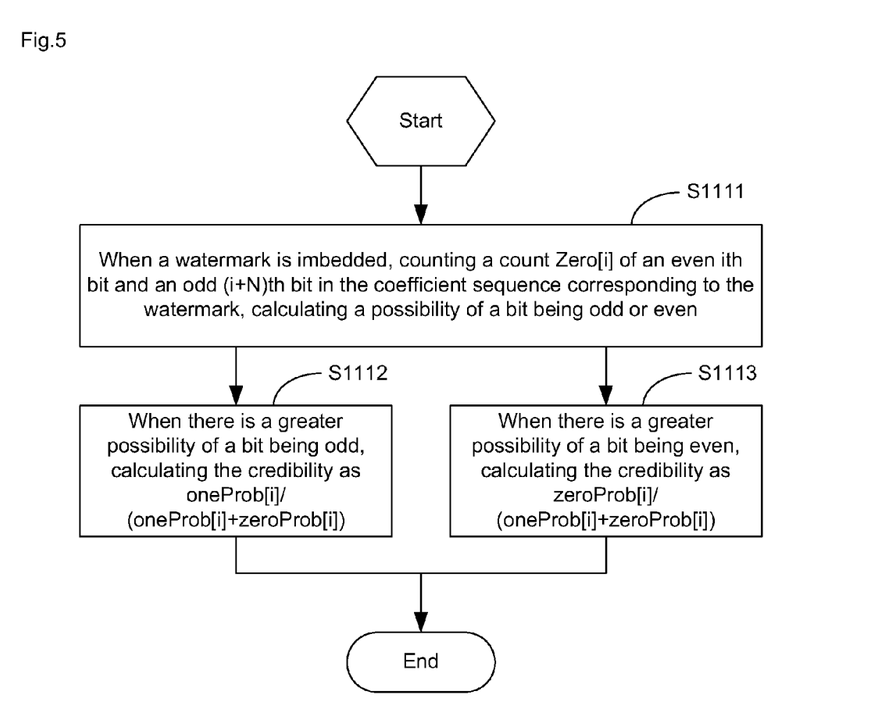
FIG. 5 is a flowchart of steps a flowchart of steps of calculating a watermark credibility in an embodiment of a method for localized blind watermark detection according to the present disclosure.

Referring to FIG. 5, the step S111 may be the processing flow of calculating a watermark credibility, which may specifically include:

step S1111, when a watermark is imbedded, counting a count Zero[i] of an even ith bit and an odd (i+N)th bit in the coefficient sequence corresponding to the watermark, calculating a possibility of a bit being odd based on a formula: $oneProb[i]=(1-\epsilon)^{(2V-zero[i])}\epsilon^{zero[i]}$ (1), and calculating a possibility of a bit being even based on a formula: $zeroProb[i]=\epsilon^{(2V-zero[i])}(1-\epsilon)^{zero[i]}$ (2), wherein $\epsilon$ is an average error rate on each bit, and i is a natural number;

step S1112, when there is a greater possibility of a bit being odd, calculating the credibility as oneProb[i]/(oneProb[i]+zeroProb[i]); and step S1113, when there is a greater possibility of a bit being even, calculating the credibility as zeroProb[i]/(oneProb[i]+zeroProb[i]).

Assume a number of valid points of V, arrays Zero[i], oneProb[i], zeroProb[i] are applied, with i being natural numbers 0, 1, 2, . . . . A count of the ith bit being 0 and the (i+N)th bit being 1 in each of sequences ValidSS generated by all valid points is counted. Namely, for each sequence ValidSS, if ValidSS[i]=0 and ValidSS[i+N]=1, then Zero[i] increases by 1. Then, the possibility of each bit being 0 or 1 is calculated based on formulae (1) or (2): $oneProb[i]=(1-\epsilon)^{(2V-zero[i])}\epsilon^{zero[i]}$ (1); $zeroProb[i]=\epsilon^{(2V-zero[i])}(1-\epsilon)^{zero[i]}$ (2). Wherein, oneProb[i] and zeroProb[i] are relatively possibilities of each bit being 0 or 1. $\epsilon$ is an average error rate on each bit that is available through counting. Assume that a watermark sequence SS[i] is output, if oneProb[i]>zeroProb[i], then SS[i]=1 is output, with the possible credibility being oneProb[i]/(oneProb[i]+zeroProb[i]), otherwise SS[i]=0 is output, with the credibility being zeroProb[i]/(oneProb[i]+zeroProb[i]).

Step S112 may be the processing flow of watermark identifying and matching, which may specifically include: comparing the sequence with massive watermark information in a database according to a descending credibility, and when an error occurs to the ith bit during the comparison, returning to a resulted watermark that matches the coefficient sequence on those bits from the 0th bit to the (i−1)th bit.

The specific reasoning process in step S11 is as follows.

Assume that a category WATERMARK is w1, a category NON-WATERMARK is w2, and a state of a count Q of bits with equal values in the first N coefficients (from UnKnowSS[0] to UnKnowSS[i]) and in the last N coefficients (from UnKnowSS[i+1] to UnKnowSS[i+N]) in the unknown sequence UnKnowSS is θ, then the possibility of determining that the state belongs to the category WATERMARK is p(w1|θ), and the possibility of determining that the state belongs to the category NON-WATERMARK is p(w2|θ), and according to a Bayesian posteriori estimation:

$$p(w1 \mid \theta) = \frac{p(\theta \mid w1)p(w1)}{p(\theta \mid w1)p(w1) + p(\theta \mid w2)p(w2)}; \quad (3)$$

Assume that the possibilities of an equal bit for any match of sequence UnKnowSS <UnKnowSS[i],UnKnowSS[i+N]> in case of category WATERMARK w1 are independent of each other, and are all P(BitAccord|w1) then:

$$p(\theta|w1) = C_N^Q P(\text{BitAccord}|w1)^Q P(\text{BitDisAccord}|w1)^{(N-Q)} \quad (4);$$

likewise:

$$p(\theta|w2) = C_N^Q P(\text{BitAccord}|w2)^Q P(\text{BitDisAccord}|w2)^{(N-Q)} \quad (5);$$

In case of category WATERMARK w1, the average error rate of change of each bit due to noise and compression is ε, then:

$$P(\text{BitAccord}|w1) = 2\epsilon(1-\epsilon) \quad (6)$$

In case of category NON-WATERMARK w2:

$$P(\text{BitAccord}|w2) = P(\text{BitDisAccord}|w2) = 0.5 \quad (7);$$

Let R=p(w2)/p(w1), then putting formulae (4)-(7) into formula (3) results in $$p(w1 \mid \theta) = \frac{(0.19)^{12}(0.81)^{116}2^{128}}{(0.19)^{12}(0.81)^{116}2^{128} + R}; \quad (8)$$

Experiments and statistics give that under tailoring, format transformation, and mild compression (with a compression rate no less than 60%), estimated ε is lower than 0.1, putting the estimation into formula (8), and letting N=128, Q=12, R<10000 results in $$p(w1 \mid \theta) = \frac{(0.19)^{12}(0.81)^{116}2^{128}}{(0.19)^{12}(0.81)^{116}2^{128} + R} > 1 - (0.1)^{15}; \quad (9)$$

It may be known from the derivation that when Q<=12, it's possible to determined that unknown sequence UnKnowSS belongs to the category WATERMARK.

The specific reasoning process of the step S111 is as follows.

Assume that the real watermark information corresponding to a valid sequence ValidSS is SS, then on each bit:

$$p(\text{Valid}SS[i]=1|SS[i]=0) = p(\text{Valid}SS[i]=0|SS[i]=1) = \epsilon \quad (10)$$

Assuming a number of valid points V, a state sequence Bit[i][j] is formed with sequences ValidSS generated by all valid points, wherein i=0, 1, ..., 2*N; j=0, 1, ..., V; then according to a Bayesian posteriori formula:

$$p(SS[i]=0 \mid \text{Bit}[i]) = \frac{p(\text{Bit}[i] \mid SS[i]=0)p(SS[i]=0)}{p(\text{Bit}[i] \mid SS[i]=0)p(SS[i]=0) + p(\text{Bit}[i] \mid SS[i]=1)p(SS[i]=1)}; \quad (11)$$

The sequence Bit[i] reflects the states of the ith and the (i+N)th bit (test bit) on different valid points, array Zero[i] indicates a number of a 0 state on Bit[i] and a number of a 1 state on Bit[i+N]. Assume that bit states on different points are independent of each other, then according to formula (10):

$$p(\text{Bit}[i]|SS[i]=1) = C_{2V}^{\text{zero}[i]} \epsilon^{\text{zero}[i]}(1-\epsilon)^{2V-\text{zero}[i]} \quad (12);$$

$$p(\text{Bit}[i]|SS[i]=0) = C_{2V}^{\text{zero}[i]} \epsilon^{2V-\text{zero}[i]}(1-\epsilon)^{\text{zero}[i]} \quad (13);$$

Let p(SS[i]=0)=p(SS[i]=1), oneProb[i]= $(1-\epsilon)^{(2V-\text{zero}[i])}\epsilon^{\text{zero}[i]}$(1), zeroProb[i]=$\epsilon^{(2V-\text{zero}[i])}(1-\epsilon)^{\text{zero}[i]}$ (2), then according to formulae (12) (13), formula (11) may be rewritten as:

$$p(SS[i] = 0 \mid \text{Bit}[i]) = \frac{\text{zeroProb}[i]}{\text{zeroProb}[i] + \text{oneProb}[i]},$$

and likewise, $$p(SS[i] = 1 \mid \text{Bit}[i]) = \frac{\text{oneProb}[i]}{\text{zeroProb}[i] + \text{oneProb}[i]}.$$

In the embodiment, with the method for localized blind watermark detection, redundant expansion may be performed on watermark data to increase the scale of test data with respect to the original bit data (by at least a factor of 2, for example) before embedding the test data into a transformation domain of the vicinity of a feature point of an image; during detection, a sequence extracted from the transformation domain of the vicinity of a certain feature point is checked bit by bit, and it is determined whether a watermark is embedded in the vicinity of the point base on the result of the check, thereby enhancing a watermark detecting efficiency; meanwhile, during watermark matching, watermark matching may be performed according to the bit credibility; by observing the distribution of each bit in sequences extracted at different valid points, the credibility of each bit is given based on posteriori estimation, and watermark matching is performed according to the credibility, thereby enabling enhanced accuracy in watermark identification. As a watermark is embedded by way of localized embedding, the watermark has excellent robustness against attacks such as image cropping, partial PS (Photoshop) processing or modification of content of the image, or the like, thus meeting a practical requirement better.

Figure 6:
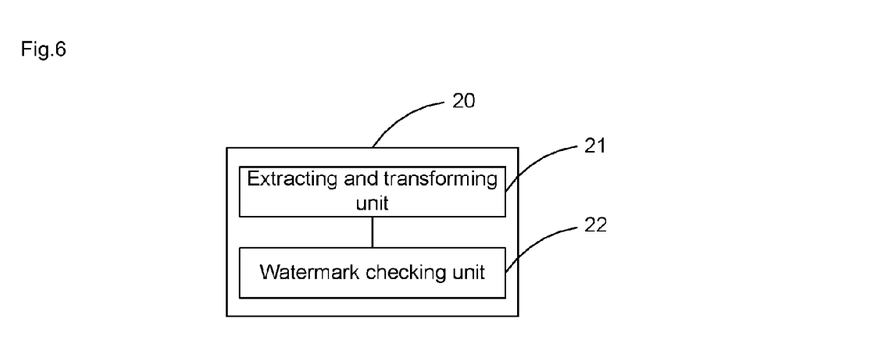
FIG. 6 is a schematic diagram of a structure in an embodiment of a device for localized blind watermark detection according to the present disclosure.

Referring to FIG. 6, an embodiment of a device 20 for localized blind watermark detection according to the present disclosure is proposed. The device 20 may include an extracting and transforming unit 21 and a watermark checking unit 22. The extracting and transforming unit 21 is configured to extract a feature point of an image, and perform domain transformation; and the watermark checking unit 22 is configured to extract a sequence of a transformation domain of the vicinity of the feature point of the image, check the sequence bit by bit, and determine that a watermark is imbedded in the vicinity of the feature point of the image when a number of bits with equal values in the first N coefficients and in the last N coefficients in the sequence is within a preset range.

With the device 20 for localized blind watermark detection, during watermark detection, a sequence extracted from a transformation domain of the vicinity of a certain feature point under detection may be checked bit by bit through the watermark checking unit 22, and it is determined whether a watermark is embedded in the vicinity of the point base on the result of the check. Thus, watermark detection is no longer key-dependent, which enables a faster and easier watermark detection with a better detection efficiency.

The flow of embedding a watermark in an image may include: generating watermark information, extracting a feature point of an image, performing DCT transformation, performing watermark embedding, and acquiring a watermarked image.

The generating watermark information may be: generating an N-dimensional pseudorandom initial sequence S according to a specific key K, and generating a 2N-dimensional sequence SS by inverting the initial sequence S bit by bit and appending the inverted sequence to the initial sequence S. In the embodiment, the key K may be the original image file, the sequence S may be a 128-dimensional sequence generated by performing an MD5 algorithm on the original image file.

The extracting a feature point of an image may be that: an RGB→YCrCb color domain transformation is performed on the original image, an illumination component Y in YCrCb is extracted. A Harris angular point is extracted on a Y diagram; and to avoid interference among pieces of embedded watermark information, it is required that there is at least a certain distance D between spatial positions of extracted angular points. In the embodiment, D may take a value of 48 pixels, a Harris window may have a size of 5×5 pixels.

The DCT transformation may be: performing a sub-block DCT transformation in an R×R-pixel window of the vicinity of each extracted feature point, with a block size of 8×8. In the embodiment, R may take a value of 32.

The performing watermark embedding may be that: for each DCT-transformed feature point, the first M coefficients of all DCT blocks are extracted in a zig-zag way, and a coefficient sequence W is obtained by arranging the extracted coefficients in one dimension, wherein the dimension of W is to be kept equal to that of the watermark sequence SS. Then quantization is performed with a quantizing factor of F, and the parity of each quantized coefficient of the coefficient sequence W is determined depending on whether a bit in the sequence SS has a value of 0 or 1. In the embodiment, M may take a value of 16, and when SS[i] is 0, W[i] takes an even number closest to W[i] after the quantization, otherwise W[i] takes an odd number.

The flow of acquiring a watermarked image may be: performing inverse transformation on all DCT blocks and obtaining a new Y1 component, then performing the YCrCb→RGB transformation and obtaining the watermarked RGB image.

In image watermark detection, the method may include: extracting a feature point of an image, performing DCT transformation, detecting whether there is any watermark, calculating a watermark credibility, watermark identifying and matching, and the like.

The processing flow of the extracting a feature point of an image and the performing DCT transformation during the watermark detection may be the same as the processing flow in the extracting a feature point of an image and the performing DCT transformation during the watermark embedding.

The detecting whether there is any watermark may be implemented using the watermark checking unit 22, which may be specifically configured to: extract a coefficient sequence made up of multiple coefficients of a sub-block DCT of the vicinity of the feature point of the image, count the number of bits with equal values in the first N coefficients and in the last N coefficients in the coefficient sequence, and determine that a watermark is imbedded in the vicinity of the feature point of the image when the number is less than a preset threshold (or greater than a preset threshold), wherein the value of a bit is calculated according to the parity of the bit, and the N is a positive integer.

During detection, for each feature point P of the image, a coefficient sequence W made up of the first M coefficients of the sub-block DCT of the vicinity of the feature point is extracted, and the parity of each coefficient W[i] is tested, wherein i is a natural number. In the embodiment, if W[i] is odd, then the detected sequence UnKnowSS[i] takes a bit value of 1, otherwise UnKnowSS[i] takes a bit value of 0. A number Q of bits with equal values in the first N coefficients (i.e. from UnKnowSS[0] to UnKnowSS[i]) and in the last N coefficients (i.e. from UnKnowSS[i+1] to UnKnowSS[i+N]) in the UnKnowSS is counted; and if Q is less than a preset threshold T, then the feature point is deemed to be a valid point, in which case the sequence UnknownSS is a valid sequence ValidSS, namely, includes valid watermark information. In the embodiment, the T may take a value of 12.

Figure 7:
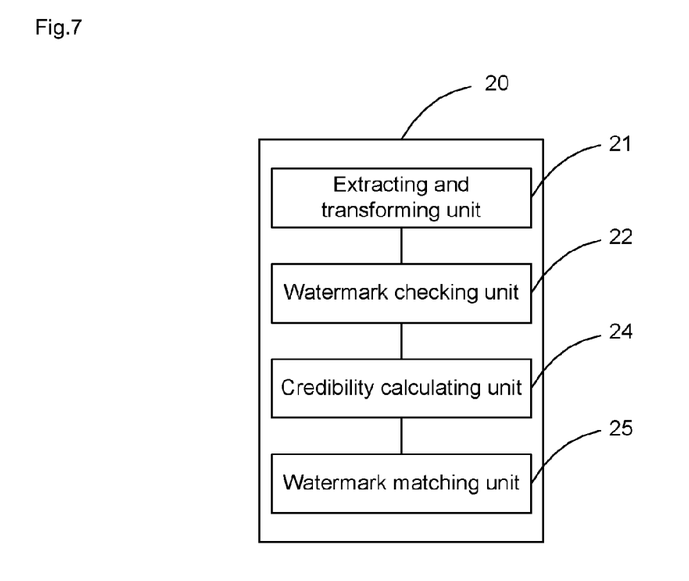
FIG. 7 is a schematic diagram of a structure in another embodiment of a device for localized blind watermark detection according to the present disclosure.

Referring to FIG. 7, in another embodiment of the present disclosure, the device 20 further includes a credibility calculating unit 24 and a watermark matching unit 25. The credibility calculating unit 24 is configured to calculate a possibility of a bit being odd or even, and calculate a bit credibility when a watermark is imbedded; and the watermark matching unit 25 is configured to perform a watermark matching according to the bit credibility.

The credibility calculating unit 24 is specifically configured to: when a watermark is imbedded, count a count Zero[i] of an even ith bit and an odd (i+N)th bit in the co-efficient sequence corresponding to the watermark, calculate a possibility of a bit being odd based on a formula: $oneProb[i]=(1-\epsilon)^{(2V-zero[1])}\epsilon^{zero[i]}$ (1), and calculate a possibility of a bit being even based on a formula: $zeroProb[1]=\epsilon^{(2V-zero[i])}(1-\epsilon)^{zero[i]}$ (2), wherein $\epsilon$ is an average error rate on each bit, i is a natural number; when there is a greater possibility of a bit being odd, calculate the credibility as $oneProb[i]/(oneProb[i]+zeroProb[i])$; and when there is a greater possibility of a bit being even, calculate the credibility as $zeroProb[i]/(oneProb[i]+zeroProb[i])$.

Assume a number of valid points of V, arrays Zero[i], oneProb[i], zeroProb[i] are applied, with i being natural numbers 0, 1, 2, . . . . A count of the ith bit being 0 and the (i+N)th bit being 1 in each of sequences ValidSS generated by all valid points is counted. Namely, for each sequence ValidSS, if ValidSS[i]=0 and ValidSS[i+N]=1, then Zero[i] increases by 1. Then, the possibility of each bit being 0 or 1 is calculated based on formulae (1) or (2): $oneProb[i]=(1-\epsilon)^{(2V-zero[1])}\epsilon^{zero[i]}$ (1); $zeroProb[i]=\epsilon^{(2V-zero[i])}(1-\epsilon)^{zero[i]}$ (2). Wherein, oneProb[i] and zeroProb[i] are relatively possibilities of each bit being 0 or 1. $\epsilon$ is an average error rate on each bit that is available through counting. Assume that a watermark sequence SS[i] is output, if $oneProb[i]>zeroProb[i]$, then SS[i]=1 is output, with the possible credibility being $oneProb[i]/(oneProb[i]+zeroProb[i])$, otherwise SS[i]=0 is output, with the credibility being $zeroProb[i]/(oneProb[i]+zeroProb[i])$.

The watermark matching unit 25 is specifically configured to: compare the coefficient sequence with massive watermark information in a database according to a descending credibility, and when an error occurs to the ith bit during the comparison, return to a resulted watermark that matches the coefficient sequence on those bits from the 0th bit to the (i−1)th bit.

In the embodiment, with the device 20 for localized blind watermark detection, redundant expansion may be performed on watermark data to increase the scale of test data with respect to the original bit data (by at least a factor of 2, for example) before embedding the test data into a transformation domain of the vicinity of a feature point of an image; during detection, a sequence extracted from the transformation domain of the vicinity of a certain feature point is checked bit by bit, and it is determined whether a watermark is embedded in the vicinity of the point base on the result of the examination, thereby enhancing a watermark detecting efficiency; meanwhile, during watermark matching, watermark matching may be performed according to the bit credibility; by observing the distribution of each bit in sequences extracted at different valid points, the credibility of each bit is given based on posteriori estimation, and watermark matching is performed according to the credibility, thereby enabling enhanced accuracy in watermark identification. As a watermark is embedded by way of localized embedding, the watermark has excellent robustness against attacks such as image cropping, partial PS (Photoshop) processing or modification of content of the image, or the like, thus meeting a practical requirement better.

Figure 8:
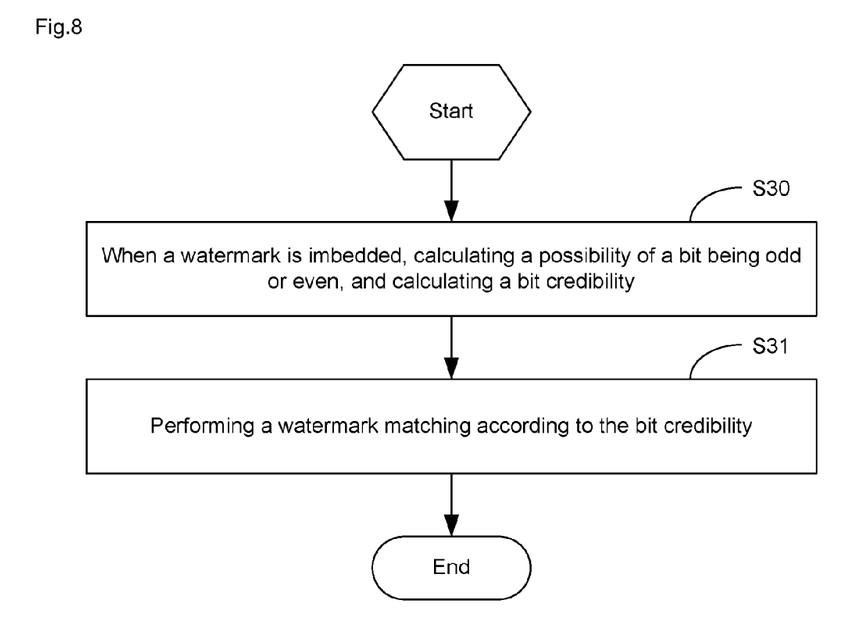
FIG. 8 is a flowchart of steps in an embodiment of another method for localized blind watermark matching according to the present disclosure.

Referring to FIG. 8, an embodiment of a method for localized blind watermark matching according to the present disclosure is proposed. The method may include:

step S30, when a watermark is imbedded, calculating a possibility of a bit being odd or even, and calculating a bit credibility; and step S31, performing a watermark matching according to the bit credibility.

Figure 9:
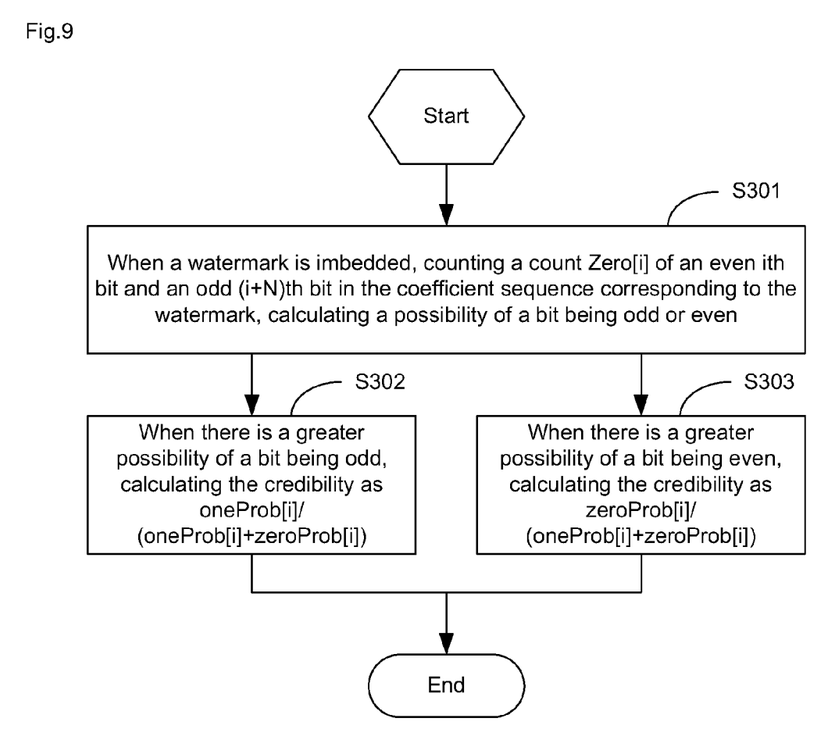
FIG. 9 is a flowchart of steps of calculating a watermark credibility in an embodiment of another method for localized blind watermark matching according to the present disclosure.

Referring to FIG. 9, the step S30 may be the processing flow of calculating a watermark credibility, which may specifically include:

step S301, when a watermark is imbedded, counting a count Zero[i] of an even ith bit and an odd (i+N)th bit in the coefficient sequence corresponding to the watermark, calculating a possibility of a bit being odd based on a formula: oneProb[i]=$(1-\epsilon)^{(2V-zero[1])}\epsilon^{zero[i]}$ (1), and calculating a possibility of a bit being even based on a formula: zeroProb[i]=$\epsilon^{(2V-zero[i])}(1-\epsilon)^{zero[i]}$ (2), wherein $\epsilon$ is an average error rate on each bit, and i is a natural number;

step S302, when there is a greater possibility of a bit being odd, calculating the credibility as oneProb[i]/(oneProb[i]+zeroProb[i]); and step S313, when there is a greater possibility of a bit being even, calculating the credibility as zeroProb[i]/(oneProb[i]+zeroProb[i]).

Assume a number of valid points of V, arrays Zero[i], oneProb[i], zeroProb[i] are applied, with i being natural numbers 0, 1, 2, . . . . A count of the ith bit being 0 and the (i+N)th bit being 1 in each of sequences ValidSS generated by all valid points is counted. Namely, for each sequence ValidSS, if ValidSS[i]=0 and ValidSS[i+N]=1, then Zero[i] increases by 1. Then, the possibility of each bit being 0 or 1 is calculated based on formulae (1) or (2): oneProb[i]=$(1-\epsilon)^{(2V-zero[i])}\epsilon^{zero[i]}$ (1); zeroProb[i]=$\epsilon^{(2V-zero[i])}(1-\epsilon)^{zero[i]}$ (2). Wherein, oneProb[i] and zeroProb[i] are relatively possibilities of each bit being 0 or 1. $\epsilon$ is an average error rate on each bit that is available through counting. Assume that a watermark sequence SS[i] is output, if oneProb[i]>zeroProb[i], then SS[i]=1 is output, with the possible credibility being oneProb[i]/(oneProb[i]+zeroProb[i]), otherwise SS[i]=0 is output, with the credibility being zeroProb[i]/(oneProb[i]+zeroProb[i]).

Step S31 may be the processing flow of watermark identifying and matching, which may specifically include: comparing the sequence with massive watermark information in a database according to a descending credibility, and when an error occurs to the ith bit during the comparison, returning to a resulted watermark that matches the coefficient sequence on those bits from the 0th bit to the (i−1)th bit.

The flow of embedding a watermark in an image may include: generating watermark information, extracting a feature point of an image, performing DCT transformation, performing watermark embedding, and acquiring a watermarked image.

In the embodiment, with the method for localized blind watermark matching, redundant expansion may be performed on watermark data to increase the scale of test data with respect to the original bit data (by at least a factor of 2, for example) before embedding the test data into a transformation domain of the vicinity of a feature point of an image; during watermark matching, watermark matching may be performed according to the bit credibility; by observing the distribution of each bit in sequences extracted at different valid points, the credibility of each bit is given based on posteriori estimation, and watermark matching is performed according to the credibility, thereby enabling enhanced accuracy in watermark identification. As a watermark is embedded by way of localized embedding, the watermark has excellent robustness against attacks such as image cropping, partial PS (Photoshop) processing or modification of content of the image, or the like, thus meeting a practical requirement better.

Figure 10:
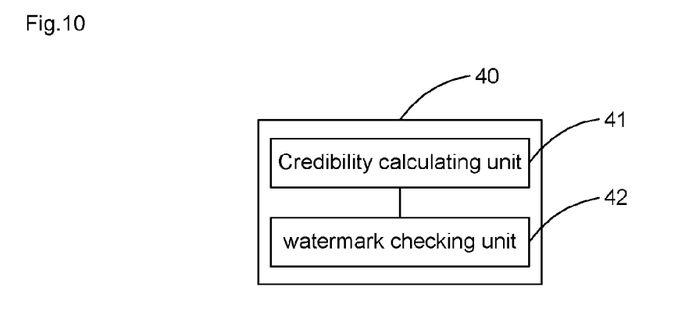
FIG. 10 is a schematic diagram of a structure in an embodiment of another device for localized blind watermark matching according to the present disclosure.

Referring to FIG. 10, an embodiment of a device for localized blind watermark matching according to the present disclosure is proposed. The device 40 may include a credibility calculating unit 41 and a watermark matching unit 42. The credibility calculating unit 41 is configured to calculate a possibility of a bit being odd or even, and calculate a bit credibility when a watermark is imbedded; and the watermark matching unit 42 is configured to perform a watermark matching according to the bit credibility.

The calculating a watermark credibility may be implemented specifically using the credibility calculating unit 41, which may be specifically configured to: when a watermark is imbedded, count a count Zero[i] of an even ith bit and an odd (i+N)th bit in the coefficient sequence corresponding to the watermark, calculate a possibility of a bit being odd based on a formula: oneProb[i]=$(1-\epsilon)^{(2V-zero[1])}\epsilon^{zero[i]}$ (1), and calculate a possibility of a bit being even based on a formula: zeroProb[i]=$\epsilon^{(2V-zero[1])}(1-\epsilon)^{zero[i]}$ (2), wherein $\epsilon$ is an average error rate on each bit, i is a natural number; when there is a greater possibility of a bit being odd, calculate the credibility as oneProb[i]/(oneProb[i]+zeroProb[i]); and when there is a greater possibility of a bit being even, calculate the credibility as zeroProb[i]/(oneProb[i]+zeroProb[i]).

Assume a number of valid points of V, arrays Zero[i], oneProb[i], zeroProb[i] are applied, with i being natural numbers 0, 1, 2, . . . . A count of the ith bit being 0 and the (i+N)th bit being 1 in each of sequences ValidSS generated by all valid points is counted. Namely, for each sequence ValidSS, if ValidSS[i]=0 and ValidSS[i+N]=1, then Zero[i] increases by 1. Then, the possibility of each bit being 0 or 1 is calculated based on formulae (1) or (2): oneProb[i]=$(1-\epsilon)^{(2V-zero[i])}\epsilon^{zero[i]}$ (1); zeroProb[i]=$\epsilon^{(2V-zero[i])}(1-\epsilon)^{zero[i]}$ (2). Wherein, oneProb[i] and zeroProb[i] are relatively possibilities of each bit being 0 or 1. $\epsilon$ is an average error rate on each bit that is available through counting. Assume that a watermark sequence SS[i] is output, if oneProb[i]>zeroProb[i], then SS[i]=1 is output, with the possible credibility being oneProb[i]/(oneProb[i]+zeroProb[i]), otherwise SS[i]=0 is output, with the credibility being zeroProb[i]/(oneProb[i]+zeroProb[i]).

The watermark identifying and matching may be implemented specifically using the watermark matching unit 42, which is specifically configured to: compare the coefficient sequence with massive watermark information in a database according to a descending credibility, and when an error occurs to the ith bit during the comparison, return to a resulted watermark that matches the coefficient sequence on those bits from the 0th bit to the (i−1)th bit.

The flow of embedding a watermark in an image may include: generating watermark information, extracting a feature point of an image, performing DCT transformation, performing watermark embedding, and acquiring a watermarked image.

In the embodiment, with the device 40 for localized blind watermark matching, redundant expansion may be performed on watermark data to increase the scale of test data with respect to the original bit data (by at least a factor of 2, for example) before embedding the test data into a transformation domain of the vicinity of a feature point of an image; during watermark matching, watermark matching may be performed according to the bit credibility; by observing the distribution of each bit in sequences extracted at different valid points, the credibility of each bit is given based on posteriori estimation, and watermark matching is performed according to the credibility, thereby enabling enhanced accuracy in watermark identification. As a watermark is embedded by way of localized embedding, the watermark has excellent robustness against attacks such as image cropping, partial PS (Photoshop) processing or modification of content of the image, or the like, thus meeting a practical requirement better.

Those ordinarily skilled in the art would appreciate that the above mentioned steps or units may be implemented by one or more processors with computer program running thereon. The computer program can be stored in a non-transitory computer-readable storage medium. When the computer program is executed, the above steps or units can be included.

When implemented in form of a software functional module and sold or used as an independent product, an integrated module of an embodiment of the present disclosure may also be stored in computer-readable storage medium. Based on such an understanding, the essential part or a part contributing to prior art of the technical solution of an embodiment of the present disclosure may appear in form of a software product, which software product is stored in storage media, and includes a number of instructions for causing a computer (such as a personal computer, a server, a network equipment, or the like) to execute all or part of the methods in various embodiments of the present disclosure. The storage medium include various types of medium that can store program codes such as a U disk, a mobile hard disk, a Read-Only Memory (ROM), a Random Access Memory (RAM), a magnetic disk, a CD, and the like. Thus, an embodiment of the present disclosure is not limited to any specific combination of hardware and software.

What described are merely preferred embodiments of the present disclosure, and do not limit the patent scope of the present disclosure; any equivalent structure or equivalent flow variation made using the content of the specification and drawings of the present disclosure, or any direct/indirect application to another relevant art likewise falls in the protection scope of the present disclosure.

The invention claimed is:

1. A method for localized blind watermark detection, comprising:
   extracting a feature point of an image, and performing domain transformation;
   extracting a sequence of a transformation domain of the vicinity of the feature point of the image, checking the sequence bit by bit, and determining that a watermark is imbedded in the vicinity of the feature point of the image when a number of bits with equal values in the first N coefficients and in the last N coefficients in the sequence is within a preset range;
   wherein the preset range is when the number of bits is less than a preset threshold, and wherein a value of a bit is calculated according to a parity of the bit, and N is a positive integer.

2. The method according to claim 1, wherein the step of extracting a sequence of a transformation domain of the vicinity of the feature point of the image, checking the sequence bit by bit, and determining that a watermark is imbedded in the vicinity of the feature point of the image when a number of bits with equal values in the first N coefficients and in the last N coefficients in the sequence is within a preset range is:
   extracting a coefficient sequence made up of multiple coefficients of a sub-block DCT of the vicinity of the feature point of the image, counting the number of bits with equal values in the first N coefficients and in the last N coefficients in the coefficient sequence.

3. The method according to claim 2, further comprising:
   calculating a possibility of a bit of the coefficient sequence being odd or even, and calculating a bit credibility of a bit of the coefficient sequence when a watermark is imbedded;
   performing a watermark matching according to the bit credibility.

4. The method according to claim 3, wherein the step of calculating a possibility of a bit of the coefficient sequence being odd or even, and calculating a bit credibility of a bit of the coefficient sequence when a watermark is imbedded is:
   when a watermark is imbedded, counting a count Zero[i] of an even ith bit and an odd (i+N)th bit in the coefficient sequence corresponding to the watermark, calculating a possibility of a bit of the coefficient sequence being odd based on a formula: oneProb[i]=$(1-\epsilon)^{(2V-zero[i])}\epsilon^{zero[i]}$(1), and calculating a possibility of a bit of the coefficient sequence being even based on a formula: zeroProb[i]=$\epsilon^{(2V-zero[i])}(1-\epsilon)^{zero[i]}$(2), wherein $\epsilon$ is an average error rate on each bit, and i is a natural number;
   when there is a greater possibility of a bit of the coefficient sequence being odd, calculating the credibility as oneProb[i]/(oneProb[i]+zeroProb[i]); and
   when there is a greater possibility of a bit of the coefficient sequence being even, calculating the credibility as zeroProb[i]/(oneProb[i]+zeroProb[i]).

5. The method according to claim 3, wherein the performing a watermark matching according to the bit credibility is:
   comparing the coefficient sequence with massive watermark information in a database according to a descending credibility, and when an error occurs to an ith bit during the comparison, returning to a resulted watermark that matches the coefficient sequence on those bits from a 0th bit to a (i−1)th bit.

6. A device for localized blind watermark detection, comprising:
   an extracting and transforming unit configured to extract a feature point of an image, and perform domain transformation;

a watermark checking unit configured to extract a sequence of a transformation domain of the vicinity of the feature point of the image, check the sequence bit by bit, and determine that a watermark is imbedded in the vicinity of the feature point of the image when a number of bits with equal values in the first N coefficients and in the last N coefficients in the sequence is within a preset range;

wherein the preset range is when the number of bits is less than a preset threshold, and wherein a value of a bit is calculated according to a parity of the bit, and N is a positive integer.

7. The device according to claim 6, wherein the watermark checking unit is configured to:

extract a coefficient sequence made up of multiple coefficients of a sub-block DCT of the vicinity of the feature point of the image, count the number of bits with equal values in the first N coefficients and in the last N coefficients in the coefficient sequence.

8. The device according to claim 7, further comprising:

a credibility calculating unit configured to calculate a possibility of a bit of the coefficient sequence being odd or even, and calculate a bit credibility of a bit of the coefficient sequence when a watermark is imbedded; and a watermark matching unit configured to perform a watermark matching according to the bit credibility.

9. The device according to claim 8, wherein the credibility calculating unit is configured to:

when a watermark is imbedded, count a count Zero[i] of an even ith bit and an odd (i+N)th bit in the coefficient sequence corresponding to the watermark, calculate a possibility of a bit of the coefficient sequence being odd based on a formula: $oneProb[i]=(1-\epsilon)^{(2V-zero[i])}\epsilon^{zero[i]}$ (1), and calculate a possibility of a bit of the coefficient sequence being even based on a formula: $zeroProb[i]=\epsilon^{(2V-zero[i])}(1-\epsilon)^{zero[i]}$ (2), wherein $\epsilon$ is an average error rate on each bit, i is a natural number; when there is a greater possibility of a bit of the coefficient sequence being odd, calculate the credibility as oneProb[i]/(oneProb[i]+zeroProb[i]); and when there is a greater possibility of a bit of the coefficient sequence being even, calculate the credibility as zeroProb[i]/(oneProb[i]+zeroProb[i]).

10. The device according to claim 8, wherein the watermark matching unit is configured to:

compare the coefficient sequence with massive watermark information in a database according to a descending credibility, and when an error occurs to an ith bit during the comparison, return to a resulted watermark that matches the coefficient sequence on those bits from a 0th bit to an (i−1)th bit.

11. The device according to claim 6, further comprising:

a credibility calculating unit configured to calculate a possibility of a bit of a coefficient sequence being odd or even, and calculate a bit credibility of a bit of the coefficient sequence when a watermark is imbedded; and a watermark matching unit configured to perform a watermark matching according to the bit credibility.

12. The device according to claim 11, wherein the credibility calculating unit is configured to:

when a watermark is imbedded, count a count Zero[i] of an even ith bit and an odd (i+N)th bit in the coefficient sequence corresponding to the watermark, calculate a possibility of a bit of the coefficient sequence being odd based on a formula: $oneProb[i]=(1-\epsilon)^{(2V-zero[i])}\epsilon^{zero[i]}$ (1), and calculate a possibility of a bit of the coefficient sequence being even based on a formula: $zeroProb[i]=\epsilon^{(2V-zero[i])}(1-\epsilon)^{zero[i]}$ (2), wherein $\epsilon$ is an average error rate on each bit, i is a natural number; when there is a greater possibility of a bit of the coefficient sequence being odd, calculate the credibility as oneProb[i]/(oneProb[i]+zeroProb[i]); and when there is a greater possibility of a bit of the coefficient sequence being even, calculate the credibility as zeroProb[i]/(oneProb[i]+zeroProb[i]).

13. The device according to claim 11, wherein the watermark matching unit is configured to:

compare the coefficient sequence with massive watermark information in a database according to a descending credibility, and when an error occurs to an ith bit during the comparison, return to a resulted watermark that matches the coefficient sequence on those bits from a 0th bit to an (i−1)th bit.

\* \* \* \* \*